INVENTORS
ROBERT O. TEEG
ROBERT W. HALLMAN

United States Patent Office 3,557,026
Patented Jan. 19, 1971

3,557,026
HIGH THERMAL HYSTERESIS VANADIUM DIOXIDE
Robert O. Teeg, Grosse Pointe, and Robert W. Hallman, St. Clair Shores, Mich., assignors to Teeg Research, Inc., Detroit, Mich., a corporation of Delaware
Filed July 17, 1967, Ser. No. 654,000
Int. Cl. H01b 1/06; C01g 31/00
U.S. Cl. 252—518                        3 Claims

ABSTRACT OF THE DISCLOSURE

Vanadium dioxide provided with a substantially complex domain structure and exhibiting a substantially increased thermal hysteresis of its normal range of transition temperature. The high hysteresis vanadium dioxide is obtained by reducing the normal oxygen content of vanadium dioxide below stoichiometric proportion or, alternately, by doping the vanadium dioxide with an appropriate isomorphic metal oxide.

CROSS REFERENCE TO RELATED APPLICATIONS

The present application relates to vanadium dioxide in the form of crystals or thin films obtained by diverse processes, such as those disclosed in co-pending application Ser. No. 258,065, filed Apr. 7, 1964, Vanadium Suboxide Thin Films and Processes for Preparing the same, now Pat. No. 3,455,724 and Ser. No. 447,546, filed Apr. 12, 1965, Processes for Obtaining Vanadium Suboxides. The present application is a continuation-in-part of application Ser. No. 648,712, filed June 26, 1967 and entitled: Low Thermal Hysteresis Vanadium Dioxide.

BACKGROUND OF THE INVENTION

(1) Field of the invention

The present invention relates to vanadium dioxide of a general formula $VO_x$ wherein $x$ is comprised substantially between 1.9 and 2.1, prepared according to the methods disclosed in the aforesaid co-pending applications, as well as according to the methods of epitaxial growth by various processes, including the decomposition of vanadium oxychloride as reported by Shigenao Koide and Humihiko Tokei (J. Phys. Soc. Japan, 22 (1967), pages 946–947, and J. Phys. Soc. Japan, 21 (1966), p. 1010).

Vanadium dioxide prepared according to the present invention is provided with substantially increased thermal hysteresis through the transition temperature at which vanadium dioxide exhibits a sudden color change accompanied by sudden electric or resistivity change. Although the transition temperature of substantially pure vanadium dioxide is in the neighborhood of 65° C., such transition is generally characterized by some hysteresis that causes the transition to be effected at a higher temperature when vanadium dioxide is heated from below its transition temperature to above its transition temperature and the reverse transition to be effected at a transition temperature lower by as much as one or two degrees centigrade when cooled. The present invention relates to treating vanadium dioxide in crystalline bulk form or in crystalline thin film form for the purpose of increasing substantially such normal thermal hysteresis range.

Substantially pure vanadium dioxide has a transition temperature which, as previously mentioned, is in the neighborhood of 65° C. The present invention further provides for means for doping vanadium dioxide in such a manner as to change its transition temperature to a transition temperature substantially lower than the normal transition temperature, such decrease of the transition temperature being accompanied by a substantial increase in the normal thermal hysteresis range of the vanadium dioxide.

(2) Description of the prior art

The prior art known to applicants includes, in addition to the above cited communications in J. Phys. Soc. Japan, U.S. Pat. No. 3,149,298, entitled Neel Effect Switching Device, issued Sept. 15, 1964 to E. T. Handleman.

In applicants' copending application Ser. No. 648,712, filed June 26, 1967 there are disclosed methods for substantially reducing the normal thermal hysteresis of vanadium dioxide about its transition temperature, for use in certain applications such as thermal detectors, sensors, radiation imaging devices and the like, for example as disclosed in co-pending applications Ser. Nos. 379,609 and 379,610, filed July 1, 1964, now Pats. Nos. 3,365,576 and 3,365,577, respectively. However, for other applications such as Neel Effect Switching Devices or memory devices capable of remaining in a predetermined state, characterized by coloration or electrical resistivity, until thermally switched to a second state, it is evident that vanadium dioxide provided with a wide thermal hysteresis range, as obtained by the methods of the present invention, presents considerable advantages.

SUMMARY OF THE INVENTION

The principal object, therefore, of the present invention is to provide vanadium dioxide having a thermal hysteresis across its transition temperature substantially greater than the normal thermal hysteresis of vanadium dioxide as conventionally obtained. Such a result is obtained, according to the present invention, by either decreasing the oxygen content of vanadium dioxide below stoichiometric proportions, or by doping vanadium dioxide with an isomorphic metal oxide with the additional results that the normal average transition temperature of vanadium dioxide thus modified is also decreased by a substantial amount.

The many objects and advantages of the present invention will be readily apparent to those skilled in the art when the following description of the invention is read in conjunction with the accompanying drawings wherein,

DETAILED DESCRIPTION OF THE PREFERRED EMBODIMENTS

Vanadium dioxide may be prepared in the form of a thin crystalline film on a substrate by evaporating vanadium pentoxide under reduced atmospheric pressure, for example, from $10^{-4}$ mm. Hg to $10^{-6}$ mm. Hg, at a temperature in the range of 500° C. to 850° C., condensating a thin film of evaporated vanadium pentoxide upon the substrate, and reducing the vanadium pentoxide thin film to vanadium dioxide at a temperature of about 400° C. to 600° C., under a pressure in the range of $10^{-1}$ mm. Hg to $10^{-4}$ mm. Hg in the presence of reaction medium consisting of an appropriate stoichiometric amount of vanadium sesquioxide, or in the presence of a reaction medium selected from a group consisting of metal oxides having greater affinity for oxygen than vanadium pentoxide.

Methods for preparing thin films of vanadium dioxide by such processes are described in detail in the aforesaid co-pending application Ser. No. 358,065, now Pat. No. 3,455,724. In co-pending application Ser. No. 447,546, there are disclosed methods for obtaining vanadium dioxide crystals grown in vacuum from a vanadium pentoxide melt, and Shigenao Koide and Humihiko Takei have described, in the aforesaid communications through the J. Phys. Soc. Japan, techniques for epitaxial growth of vanadium dioxide single crystals.

Vanadium dioxide of the composition in the range of $VO_{1.9}$ to $VO_{2.1}$, and more particularly vanadium dioxide near the composition $VO_{2.00}$, exhibits typical temperature dependent properties. On heating, the vanadium dioxide shows a marked change in optical property, such as absorption and reflectivity, when passing from a state below a critical temperature generally called transition temperature, $Tc$, to another state above such transition temperature. The spectral transmissivity is greatly increased and the reflectivity is decreased above the transition temperature, and such change in transmissivity or reflectivity is evidenced by a sudden change in coloration of the vanodium dioxide.

Accompanying the sudden change in optical properties of vanadium dioxide when heated through the transition temperature, there is an abrupt drop in electrical resistivity of sveral orders of magnitude. Typically, such an abrupt change in optical property and electrical property of vanadium dioxide occurs on heating at a temperature which is higher by about .5 to 2.5° C., than the temperature at which the inverse abrupt change occurs upon cooling.

Figure 1:
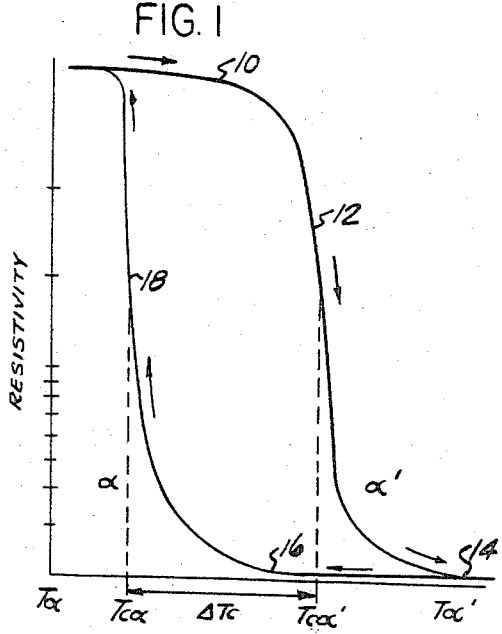
FIG. 1 is a graph showing a typical vanadium dioxide thermal hysteresis curve across the transition temperature thereof, and representing the variation in electrical resistivity of a vanadium dioxide crystal in function of its temperature.

FIG. 1 represents a typical curve of the electrical resistance of a vanadium dioxide single crystal specimen as a function of its temperature. When the crystal specimen is heated from a temperature below the transition temperature of vanadium dioxide to a temperature above the transition temperature, its electrical resistance which is substantially constant below the transition temperature, as shown by portion 10 of the curve, suddenly drops, as shown by substantially vertical portion 12 of the curve, to a much lower value, shown at portion 14, which remains substantially constant thereafter. The temperature at which the abrupt change in resistance occurs in the course of heating has been designated on FIG. 1 as temperature $Tc'$. The abrupt change of resistance, or resistivity, corresponds to a change of state of the vanadium dioxide being converted upon heating from a first state or $\alpha$ state, below the critical temperature, to a second state or $\alpha'$ state, above the critical temperature. Such a change in state is confirmed by X-ray diffraction mesaurements which indicate that below the critical temperature vanadium dioxide has substantially a monoclinic structure when in the $\alpha$ state, which is thermally converted at the transition temperature $Tc\alpha'$ into a similar tetragonal structure of the rutile type, or $\alpha'$ state. Such a change of state in crystalline structure is also demonstrated by Laue back reflection photograms of single crystals of vanadium dioxide showing that doublet Laue spots in at least one zone disappear suddenly upon heating when passing through the transition temperature.

Upon cooling the vanadium dioxide continues to exhibit a substantially low resistance even when cooled below temperature $Tc\alpha'$, as shown by portion 16 of the curve of FIG. 1. Upon reaching a temperature $Tc\alpha$, the resistance suddenly increases, as shown by portion 18 of the curve, to a value which is the normal value for vanadium dioxide below the transition temperature, or vanadium dioxide in the $\alpha$ state. The range separating the critical temperature upon heating, $Tc\alpha'$, from the critical temperature upon calling, $Tc\alpha$, represents the thermal hysteresis of the vanadium dioxide and, as previously indicated, such thermal hysteresis may vary from specimen to specimen from about .5° C. to about 2.5° C.

The therman hysteresis of vanadium dioxide presents obvious advantages for devices endowed with memory. A memory cell made of vanadium dioxide may be switched from the $\alpha$ state to the $\alpha'$ state by heating beyond temperature $Tc\alpha'$, and when cooled to a temperature between $Tc\alpha'$ and $Tc\alpha$, it will remain in its $\alpha'$ state. Subsequently cooling below $Tc\alpha$, switches the cell to its $\alpha$ state, at which it will remain even though the temperature of the cell is brought back to a temperature comprised between $Tc\alpha$ and $Tc\alpha'$. Subsequent heating beyond $Tc\alpha'$ will again switch the cell to its $\alpha'$ state, even though its temperature is brought back to an intermediate temperature between $Tc\alpha'$ and $Tc\alpha$. Consequently, all that is required is to maintain the cell wtihin the hysteresis range between $Tc\alpha$ and $Tc\alpha'$, and to supply to it appropriate heat energy inputs for heating or cooling according to the quantitative representation of the bit to be recorded, and the recorded bit is read by visual scanning (coloration of the cell) or by electrical means (resistivity).

Vanadium dioxide of composition close to stoichiometric proportion has a thermal hysteresis $\Delta Tc$, in the neighborhood of 2.5° C. When vanadium dioxide of stoichiometric proportion is treated according to a first aspect of the present invention, so as to become deficient in oxygen as compared to said stoichiometric proportions, the thermal hysteresis of the vanadium dioxide increases substantially in function of such oxygen deficiency. Such results are graphically illustrated at FIG. 2, curve 20. The reduction in oxygen content of vanadium dioxide, in a crystalline bulk form or in thin film crystalline form, is effected by heating the vanadium dioxide in a reducing atmosphere containing hydrogen for a predetermined period of time. Reduction is affected at a temperature generally above 450° C. in the reducing hydrogen atmosphere for periods of time varying in function of the amount of reduction to be obtained while effecting the reducing operation upon a vanadium dioxide specimen of substantially stoichiometric composition. The amount of reduction is a function of the temperature at which the reduction is affected and is a function of the duration of the operation. With temperatures of 450° C., a reduction time of 22 to 24 hours increases the thermal hysteresis, $\Delta Tc$, of vanadium dioxide from a normal 2.5° C. value to a 10 to 15° C. value.

Figure 3:
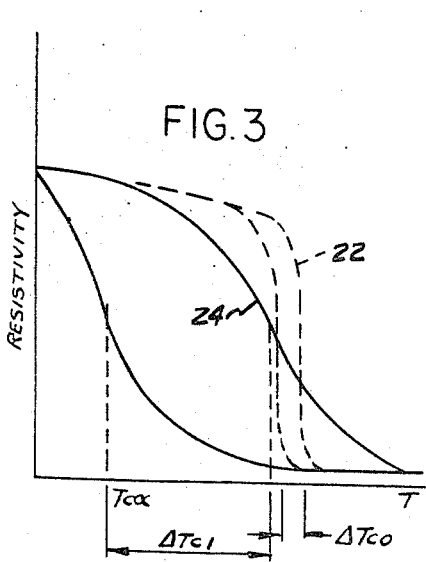
FIG. 3 is a graph comparing the normal thermal hysteresis of vanadium dioxide with the increased hysteresis resulting from treating vanadium dioxide according to the present invention.

As shown in FIG. 3, vanadium dioxide treated according to the hereinbefore explained method of the invention which originally exhibits a substantially narrow thermal hysteresis, $\Delta Tc$, as shown by doted line curve 22 showing the abrupt change in resistivity of vanadium dioxide during heating through its transition temperature and the sudden increase in resistivity when cooled to a transition temperature lower by $\Delta Tc_0$, after reduction as hereinbefore explained, exhibits a resistivity curve in function of temperature, as shown at 24, provided with a greatly increased hysteresis $\Delta Tc_1$. At the same time, the average transition temperature shows some reduction in value as compared to the average transition temperature of stoichiometric vanadium dioxide. Accompanying such an increase in thermal hysteresis as a result of rendering vanadium dioxide deficient in oxygen as compared to stoichiometric proportion, there is some reduction in the slope of the resistivity curve during heating as well as during cooling.

Figure 2:
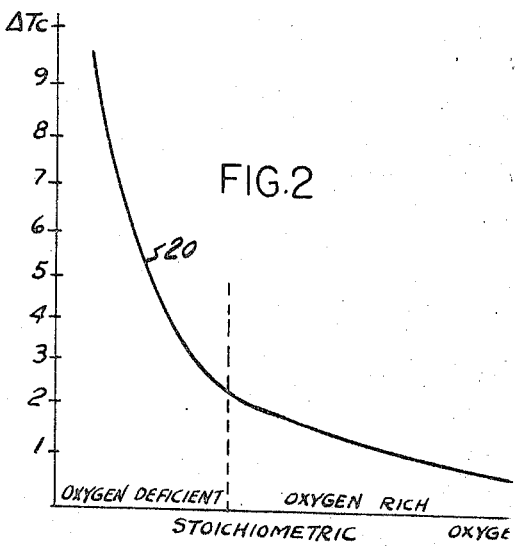
FIG. 2 is a graph representing the variation of vanadium dioxide thermal hysteresis in function of the oxygen deficiency of a vanadium dioxide crystal.
Figure 4:
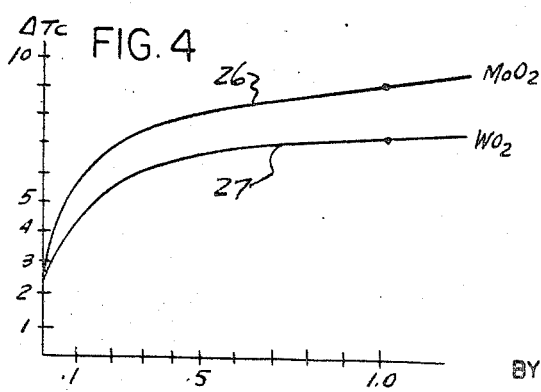
FIG. 4 is a graph of vanadium dioxide thermal hysteresis in function of the weight percent of dopant included in a vanadium dioxide crystal.

The present invention also provides for increasing substantially the normal thermal hysteresis of vanadium dioxide, $\Delta Tc$, by doping with foreign elements vanadium dioxide of stoichiometric composition having a thermal hysteresis range of about 2.5° C. as well as vanadium dioxide of a composition below stoichiometric proportion which, as shown in FIG. 2, exhibits substantially decreased thermal hysteresis. Preferably the dopant incorporated to the vanadium dioxide crystal is an isomorphic metal oxide. FIG. 4 shows a curve 26 of the increase in thermal hysteresis, $\Delta Tc$, of vanadium dioxide doped with molybdenum dioxide in function of weight percent of the dopant included in the vanadium dioxide. Curve 27 shows the effect of doping vanadium dioxide with tungsten dioxide. Other isomorphic or non-isomorphic metal oxides, such as, for example, molybdenum, titanium, tin, chromium, lead, germanium and manganese oxides may be used.

Such doping of vanadium dioxide with a foreign metal alloy or oxide is accomplished by mixing a higher oxide of the predetermined metal with vanadium pentoxide instead of using pure vanadium pentoxide for forming a thin film of vanadium dioxide, according to the methods hereinbefore mentioned and described in detail in copending application Ser. No. 358,065 now Pat. No. 3,455,724. In order to obtain a thin film of vanadium dioxide containing, for example, 1.0 wt. percent of molybdenum dioxide, a vanadium to molybdenum ratio of 156 to 1 is used in the form of vanadium pentoxide-molybdenum trioxide mix placed in the vaporization boat and in order to obtain a vanadium dioxide containing molybdenum dioxide at .1 wt. percent, a mix of vanadium pentoxide and molybdenum trioxide is utilized having a vanadium to molybdenum ratio of about 1578 to 1.

Figure 5:
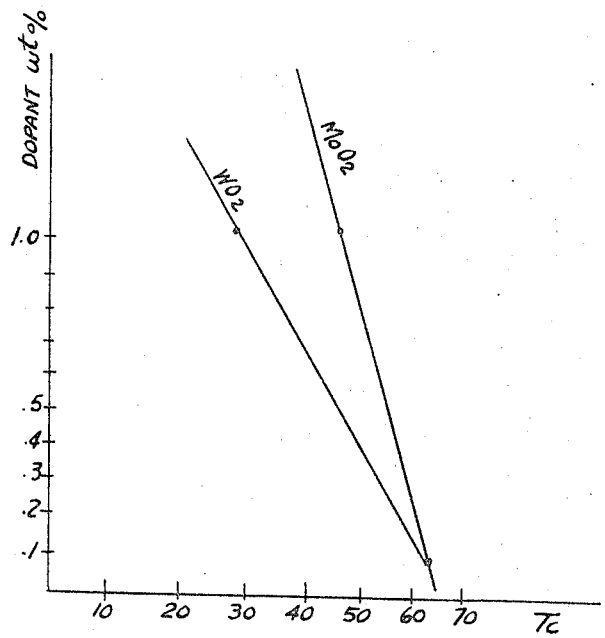
FIG. 5 is a graph ilustrating the decrease in average transition temperature of vanadium dioxide in function of the weight percent of dopant included therein.

Vanadium dioxide doped with an isomorphic metal oxide usually presents the additional advantage of exhibiting a substantial reduction of its average transition temperature. For example, vanadium dioxide doped with 1 wt. percent of tungsten dioxide has an average transition temperature of about 30° C. Vanadium dioxide doped with 1 wt. percent of molybdenum dioxide has an average transition temperature of about 50° C. The decrease in average transition temperature, according to the percentage by weight of dopant included in the vanadium dioxide is substantially as shown at FIG. 5 for molybdenum and tungsten dioxide dopants.

The thermal transition hysteresis of vanadium dioxide may seemingly be explained on the basis of domain wall movements occuring during the transitions from the $\alpha$ state to the $\alpha'$ state. Hysteresis exists as the result of an irreversible energy consumption process associated with a moving domain wall as it navigates through the crystal. Local lattice strain, dislocation, flaws, impurities and grain boundaries seem to create an impediment to the moving domain wall progression. This slowing down of, or impediment to, the moving domain wall requires an additional energy input in order for the transition from one state to the other to progress. The effect of this condition is to result in an irreversible energy loss and consequently in hysteresis. The methods of the present invention result in increasing the influence of the impediments causing hysteresis by considerably increasing local lattice strain. This theory seems to be borne out by examination of photomicrographs of sections of a single crystal of vanadium dioxide. The photomicrographs show distinct differences between the domain patterns exhibited by stoichiometric vanadium dioxide and vanadium dioxide deficient in oxygen or doped with a soluble and preferably isomorphic metal oxide, according to the methods of the present invention. Photomicrographs of vanadium dioxide specimens after treatment according to the present invention show a substantial increase in complexity of the domain structure as compared to the domain structure of untreated specimens, such that vanadium dioxide treated according to the methods of the present invention presents a complex domain structure with an accompanying increase in thermal hysteresis.

It is thus seen that the invention provides simple methods for treating vanadium dioxide, and the like, such as to cause in such treated vanadium dioxide a substantial increase in thermal transition hysteresis as compared to untreated vanadium dioxide. It is evident that, while the foregoing description sets forth the principles of the invention in connection with specific examples thereof, it is to be understood that the description is given only by way of example and not as a limitation of the scope of the invention as set forth in the accompanying claims.

What is claimed as new is:

1. A method for increasing the normal thermal hysteresis range of vanadium dioxide comprising depleting the oxygen content of vanadium dioxide below stoichiometric proportion by heating said vanadium dioxide in a reducing atmosphere at a temperature of above about 450° C.

2. The method of claim 1 wherein said depleting of said vanadium dioxide in oxygen content is effected by heating said vanadium dioxide in said reducing atmosphere for about 22 to 24 hours, said reducing atmosphere being a hydrogen atmosphere.

3. The vanadium dioxide obtained by the method of claim 2 and having a thermal hystersis of more than 2.5° C. range.

References Cited

UNITED STATES PATENTS

| 3,378,350 | 4/1968 | Sasaki | 23—140 |
| 3,557,724 | 7/1969 | Teeg et al. | 117—62 |

OTHER REFERENCES

Kosuge: J. Phys. Soc. Japan, 18(1963), 318–319 23/19.1.

Sasaki: J. Phys. Soc. Japan 19 (1964), 1748 23/19.1.

Van Steensel: Philips Res. Repts., 22, 170–177, April 1967.

DOUGLAS J. DRUMMOND, Primary Examiner

U.S. Cl. X.R.

23—21, 140

TRI-117-A-1

UNITED STATES PATENT OFFICE
CERTIFICATE OF CORRECTION

Patent No. 3,557,026      Dated   January 19, 1971

Inventor(s)    Robert O. Teeg and Robert W. Hallman

It is certified that error appears in the above-identified patent and that said Letters Patent are hereby corrected as shown below:

<u>IN THE SPECIFICATION</u>

Column 2, line 61, correct the spelling of "illustrating"

Column 3, line 55, after "temperature" cancel "$T_c'$" and insert -- $T_c\alpha'$ --

Column 4, line 5, cancel "calling" and insert -- cooling -- line 9, correct the spelling of "thermal"

Signed and sealed this 11th day of May 1971.

(SEAL)
Attest:

EDWARD M. FLETCHER, JR.
Attesting Officer

WILLIAM E. SCHUYLER, J
Commissioner of Paten